United States Patent [19]

Takakusaki et al.

[11] Patent Number: 5,039,298
[45] Date of Patent: Aug. 13, 1991

[54] LABEL APPLYING APPARATUS OF ROTARY BLOW MOLDING MACHINE

[75] Inventors: Nobuyuki Takakusaki, Kanagawa; Yoji Mizutani, Tokyo; Manabu Hosokawa, Kanagawa, all of Japan

[73] Assignee: Toyo Seikan Kaisha Ltd., Tokyo, Japan

[21] Appl. No.: 425,208
[22] PCT Filed: Jun. 27, 1988
[86] PCT No.: PCT/JP88/00641
§ 371 Date: Oct. 17, 1989
§ 102(e) Date: Oct. 17, 1989
[87] PCT Pub. No.: WO90/00138
PCT Pub. Date: Jan. 11, 1990

[51] Int. Cl.⁵ .............................. B29C 49/24
[52] U.S. Cl. .................... 425/504; 264/509; 264/543; 425/522; 425/540
[58] Field of Search ............. 425/503, 504, 522, 540; 264/509, 543

[56] References Cited

U.S. PATENT DOCUMENTS

| | | | |
|---|---|---|---|
| 1,624,849 | 4/1927 | Steele et al. | 425/503 X |
| 3,764,250 | 10/1973 | Waterloo | 425/528 |
| 4,306,849 | 12/1981 | Cress et al. | 425/504 X |
| 4,359,314 | 11/1982 | Hellmer | 264/509 X |
| 4,479,770 | 10/1984 | Slat et al. | 425/504 X |
| 4,752,206 | 6/1988 | Nowicki et al. | 425/540 X |
| 4,834,641 | 5/1989 | Keyser | 425/503 |

FOREIGN PATENT DOCUMENTS

| | | | |
|---|---|---|---|
| 194081 | 9/1986 | European Pat. Off. | 264/509 |
| 48-35879 | 10/1973 | Japan . | |
| 61-202818 | 9/1986 | Japan . | |
| 61-237620 | 10/1986 | Japan . | |

Primary Examiner—Richard L. Chiesa
Attorney, Agent, or Firm—Schwartz & Weinrieb

[57] ABSTRACT

A rotating shaft for intermittent rotation through predetermined angles is located in parallel to a rotation shaft of a rotor holding a plurality of split mold units, and rubber cups for adhering labels are secured to the front ends of links which are swingable about pins secured to the rotating shaft. The label is positioned upon the inner walls of the split mold halves when the same are in their open state by the combination of the intermittent rotation of the rotating shaft and the swinging movement of the links. The split mold holds the label by vacuum suction and the label is fused to a product when a highly heated plastic material is applied under pressure to the inner wall of the mold. A split mold holder is constructed so that when a slider-crank mechanism in association with a cam follower is positioned to a dead position, the clamping force is applied. A large force is not applied to the cam follower held by the rotor and the rotor is driven at a constant speed, thus precisely performing the positioning for the label application.

10 Claims, 12 Drawing Sheets

LABEL APPLYING APPARATUS OF ROTARY BLOW MOLDING MACHINE

TECHNICAL FIELD

This invention relates to a label mounting or applying apparatus of a rotary blow molding machine particularly in which a label or labels are positioned on the inner walls of a pair of separable mold halves which are rotatable on a circular track at a constant speed and are to be opened or closed, and the label is applied on a product in a fusible manner during the blow molding operation.

BACKGROUND ART

There is known a rotary blow molding machine in which a plurality of split mold units each comprising a pair of separable mold halves capable of being opened or closed with respect to a horizontal axis are disposed with equal spaces along the outer periphery of a rotor rotatable around the horizontal axis. A parison is extruded into the opened mold halves, which are then closed, and air is blown into the inner hollow portion of the parison to form a hollow product.

The rotary blow molding machine of the character described above is generally utilized for molding a plastic vessel or container. A label is usually mounted or pasted on the plastic container for indicating the contents thereof. With a method of bonding the label with a bonding agent on the container after the molding process, the manufacturing cost increases for the reason that the label bonding process is additionally carried out after the blow molding process, and in addition, it is difficult to establish a firm bonding condition between the label and the container. For the reason described above, there is also provided a method of fusing the label to the container by pressing a highly heated molding material to the label during the molding process of the container.

That is, U.S. Pat. No. 4,479,770 discloses a label applying device which is provided with a shrinkable label carrier attached to a dispensing head reciprocating vertically between a label magazine and open separable mold halves and in which the label is transferred from the label magazine to the inner walls of the separable mold halves during the combined two reciprocating movements.

The disclosed label applying device has a complicated driving mechanism and the dispensing head is reciprocated along a long path, so that a large driving force is required for the inertia motion.

An object of this invention is to resolve the problem described above and to provide a label applying apparatus in a rotary blow molding machine capable of being driven with a small driving force and having a simple structure.

Furthermore, with the rotary blow molding machine, it is necessary to clamp the pair of closed mold haves with a pressure or force which is sufficient to overcome the pressure of the air to be blown thereinto. Such a clamping device is disclosed in U.S. Pat. No. 3,764,250.

In the disclosed clamping device, a mold holder for holding a pair of separable mold halves is clamped by a stationary cam through means of slider crank mechanism and a compression spring.

In the clamping device of the type described, a cam follower engaged with the stationary cam is to be operated against the force of the compression spring, so that it is required for driving the cam follower supported by the rotor to apply a large driving force, and the driving force of the rotor is largely changed by a variable load for the cam follower to thereby vary the rotation speed of the rotor. The exact positioning of the label in the separable mold is a matter of significance.

In addition, the treatment of scraps such as defective products occurring in the initial stage of the blow molding process is carried out in a working space existing between a mold opening starting portion and a molded product take-out device (this working space is essential for the operation of the mechanism of the blow molding machine).

The working space is not necessary after establishing the normal molding stage subsequent to the initial molding stage, but the timing of the mold closing and the mold opening operations are controlled by the cam having a single shape, so that the mold halves are opened for a period similar to the initial molding period after having established the normal molding stage which adversely reduces the blow molding period after the normal molding condition has been established (that is: the rotation angle of the split unit in the closed state is reduced such being inconvenient.

OBJECT OF THE INVENTION

This invention is conceived so as to eliminate the problems described above and to provide a label applying apparatus in a rotary blow molding machine capable of exactly positioning the label on the inner walls of the split mold and for manufacturing products with high quality by utilizing a clamping device in which the variation of the load for driving the rotor is reduced and the blow molding period in during the normal operation condition is possibly elongated.

DISCLOSURE OF THE INVENTION

In order to solve the problems described above, there is provided a label applying apparatus in a rotary blow molding machine, according to this invention, in which a plurality of split mold units comprising a pair of separable mold halves are arranged with equal spaces along an outer periphery of a rotor rotatable around a horizontal axis, the mold halves being opened or closed in the direction of the horizontal axis, a parison is extruded into the mold halves while in their opened state, the mold halves are then closed and air is blown into an inner hollow portion of the parison to form a hollow product, a label having a thermally fusible property is positioned on an inner wall of the mold unit of the rotary blow molding machine, and a highly heated molding material is applied under pressure to the label to stick the label to the product, the apparatus being characterized in that a rotating axis is disposed in parallel to the rotating axis of the rotor which intermittently driven in a unidirectional mode so as to stop at predetermined rotational angles, two parallel links to which dispensing heads are attached are swingably secured to a lever holder secured along the rotating axis with an interval of 180°, a segment gear attached to one of the links is engaged with a rack provided for a slide block slidable on the intermittently driven rotating axis of the rotor, the parallel links being swung by the sliding movement of the slide block on the rotating axis, and a rubber cup secured to the dispensing head transfers the label to the inner walls of the split mold unit.

According to the construction of the label applying apparatus in which the label is transferred to the inner walls of the mold halves by the combination of the rotating motion and the swinging motion, the reciprocating motion along the long length of the heavy member can be eliminated, so that the driving force therefor can be reduced and the apparatus can be made compact which enables the apparatus to operate with a high speed.

The mold clamping device utilized for this invention is characterized in that a pair of mold unit holders for holding bilateral mold halves respectively are slidably supported by a guide rod mounted upon the rotor, one of the holders being operatively connected to the guide rod through means of the slidably supported slider and a hydraulic cylinder unit and the other one of the holders being operatively connected to the slider through means a lever so as to move in a direction opposing the movement of the slider, that the supported slider is connected to a cam follower engaging a clamp control cam assembly arranged near the rotor means of a slider crank mechanism supported by the so as to be movable in a radial direction thereof and to be positioned at a dead position, and that the clamping force is applied to the mold holders by the hydraulic cylinder unit when the slider-crank mechanism is positioned at the dead position. According to the construction of the clamping device, the clamping force is not applied to the slider-crank mechanism for driving the mold holders and the cam follower until the slider-crank mechanism is positioned at the dead position, and accordingly, when the clamping force is applied by the hydraulic cylinder unit, the slider crank mechanism is at the dead position, so that the clamping force is accepted by the fulcrum of the slider crank mechanism, so that the clamping force is never applied to the cam follower.

Accordingly, a large force is never applied to the cam follower held by the rotor, whereby the load applied to the rotor is maintained constant and the rotor can thus be driven at a constant speed, so that the positioning for applying the label to the inner wall of the mold can be exactly performed.

The cam for controlling the mold clamping operation comprises a stationary cam member disposed on the mold closing controlling side and a movable cam member disposed on the mold opening controlling side. The timing for opening the mold halves is achieved between the initial operation stage and the normal operation stage in the blow molding so as to thereby eliminate the working space, during the normal blow molding period, for treating the scrap such as a defective product which may be produced at during the initial stage of the molding process.

The stationary cam member for hydraulically clamping the mold halves is further secured to another stationary cam member and the movable cam member for hydraulically clamping the mold halves is further secured to another movable cam member or actuator so that the movable cam member for hydraulically clamping the mold halves is movable in synchronism with the movable cam member or actuator, whereby the second hydraulic pressure supplying period to the hydraulic cylinder unit is made variable between the initial blow molding process and the normal blow molding process.

Accordingly, during the initial blow molding stage, the movable cam is shrunk or reduced so as to shorten or quicken the mold opening time to thereby provide a working space for treating the scrap such as a faulty or defective product between the mold opening starting station and the product take-out device, and in the meantime, during the normal blow molding stage, the working space is utilized for extending the mold opening time by extending the movable cam member, whereby a product having a high quality with the label applied thereto can be obtained.

BRIEF DESCRIPTION OF THE DRAWINGS

Various other objects, features, and attendant advantages of the present invention will become more readily apparent from the following detailed description, when considered in connection with the accompanying drawings, in which like reference characters designate like or corresponding parts throughout the several views, and wherein.

BEST MODE FOR CARRYING OUT THE INVENTION

For a better disclosure of this invention, the embodiments will be explained hereunder with reference to the accompanying drawings.

Figure 1:
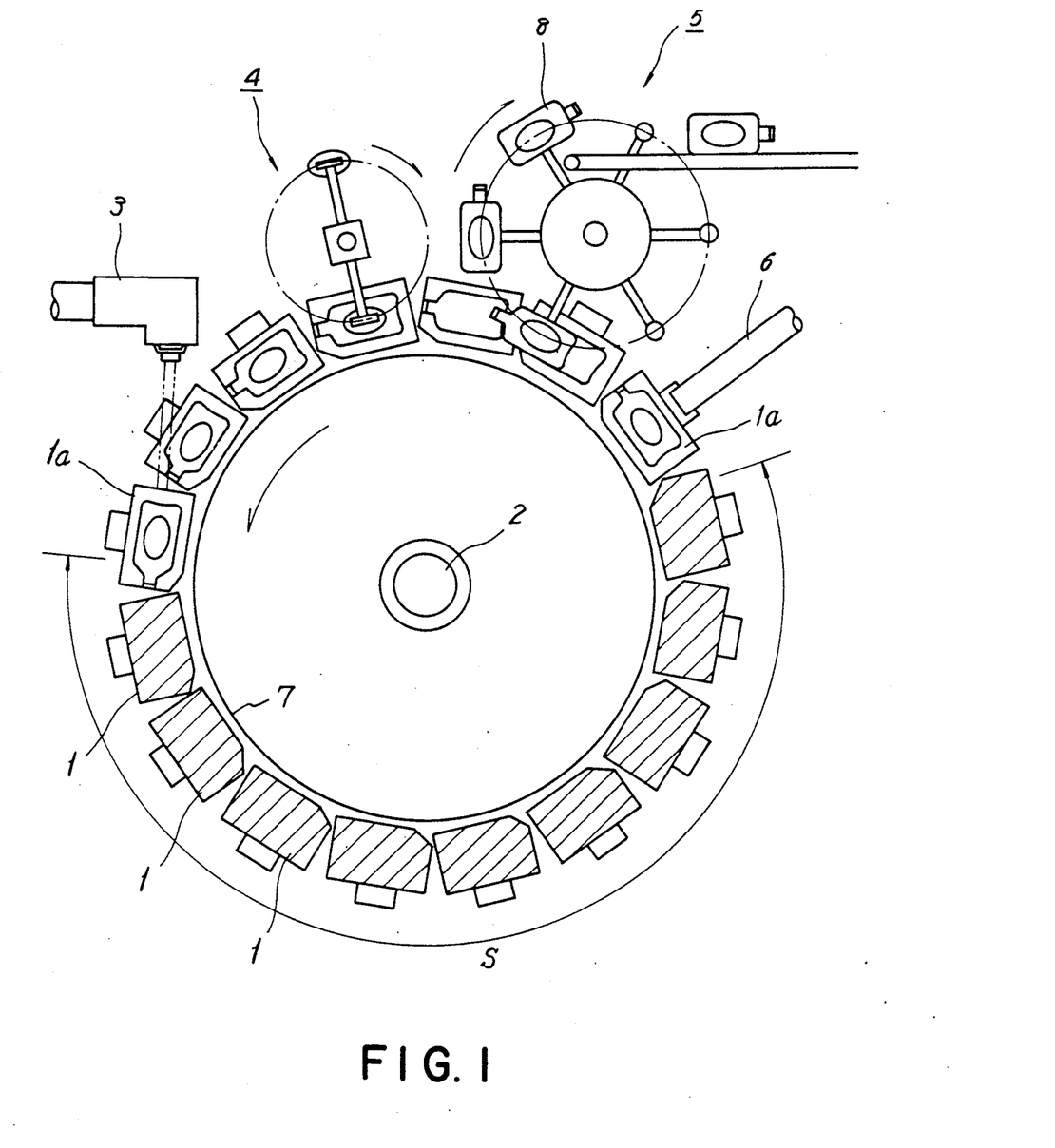
FIG. 1 is a schematic view of a rotary blow molding machine to which this invention is applicable.

FIG. 1 is an outline view of a rotary blow molding machine utilizing this invention. In FIG. 1, reference numerals 1, 1, --- designate a plurality of split mold units which are mounted with constant spaces defined therebetween along the outer peripheral portion of a rotor 7 (shown in FIG. 2) disposed so as to be rotatable about a rotary axis 2, and each of units, 1 comprises a pair of separable mold halves 1a and 1a which are closed when they pass through a rotary range S and are opened when they pass through the remaining portion of the rotary range. A mechanism for effecting the opening and closing of the mold units 1 will be described hereinafter.

A plastic tube, i.e. that is, a parison, extruded from an extruding die 3 into the space between the respective bilateral separable mold halves 1a and 1a of each mold unit 1 is provided with both sides which define the inner hollow portion. Both sides are tightly closed when the mold halves 1a and 1a are closed and air is blown into the inner hollow portion by means of a blowing needle located within the split mold unit so as to form a container having a shape according to the inner wall shapes of the mold halves 1a and 1a.

The formed plastic container to thereafter cooled by cooling water passing through the interior of the mold halves 1a and 1a, thus the container being molded as a product 8.

Where the mold halves 1a and 1a are opened, scrap parison material remaining between the mold unit 1 (existing between the adjacent products a connecting portion) is first blown off by air injected into a scrap receptacle 6 and the product 8 is taken out of the mold under suction by a product take-out device 5 and then transferred on a belt conveyer.

Labels are thereafter arranged on the bilateral inner wall surfaces of the mold halves 1a and 1a by a label arranging device 4. The structure of the label arranging device 4 will be described hereinafter. The labels arranged on the wall surfaces of the mold halves 1a and 1a are integrally fused to the product 8 when the labels are thereafter pressed with highly heated plastic material. According to this mode of operation, the product 8 is manufactured with the label applied during the blow molding process.

Figure 2:
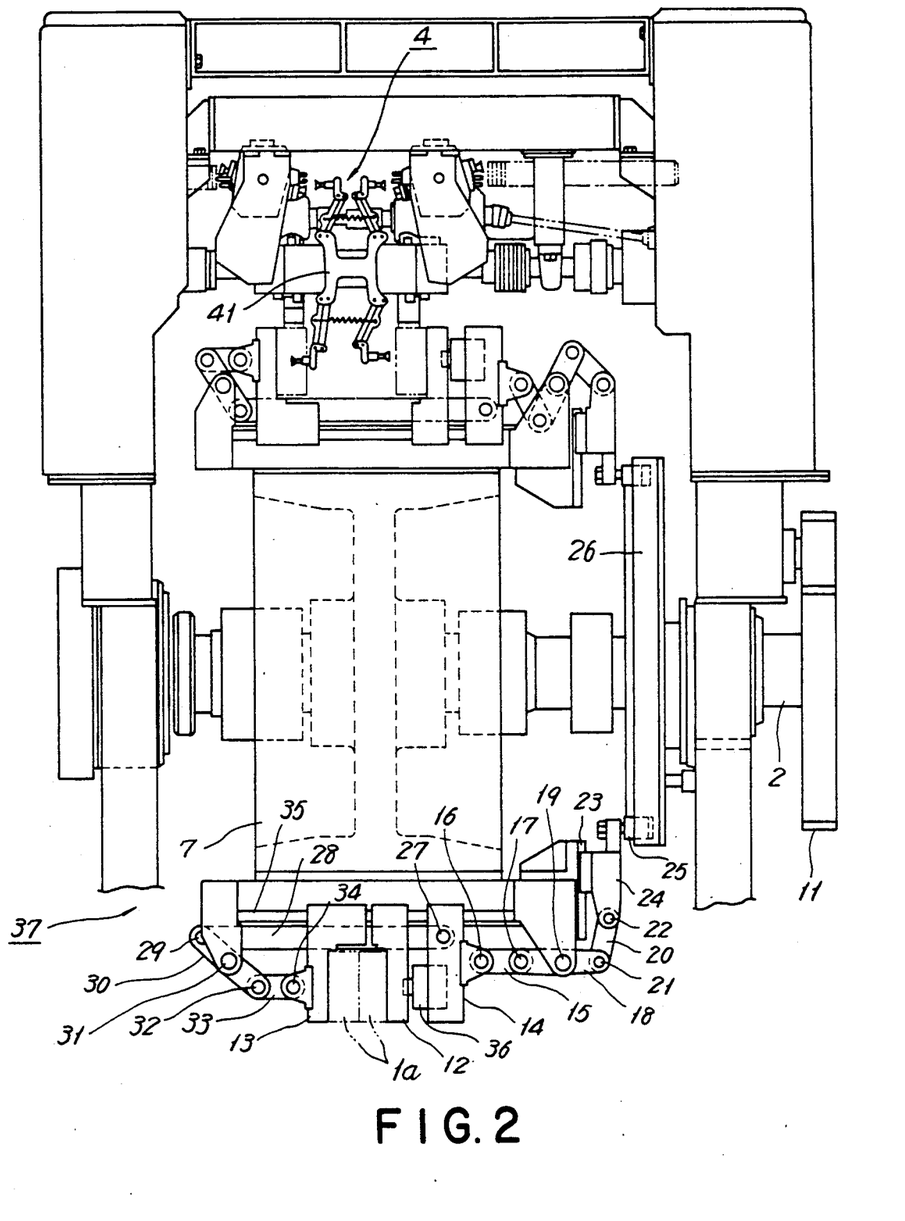
FIG. 2 is a front view of the machine, partially eliminated, shown in FIG. 1.
Figure 3:
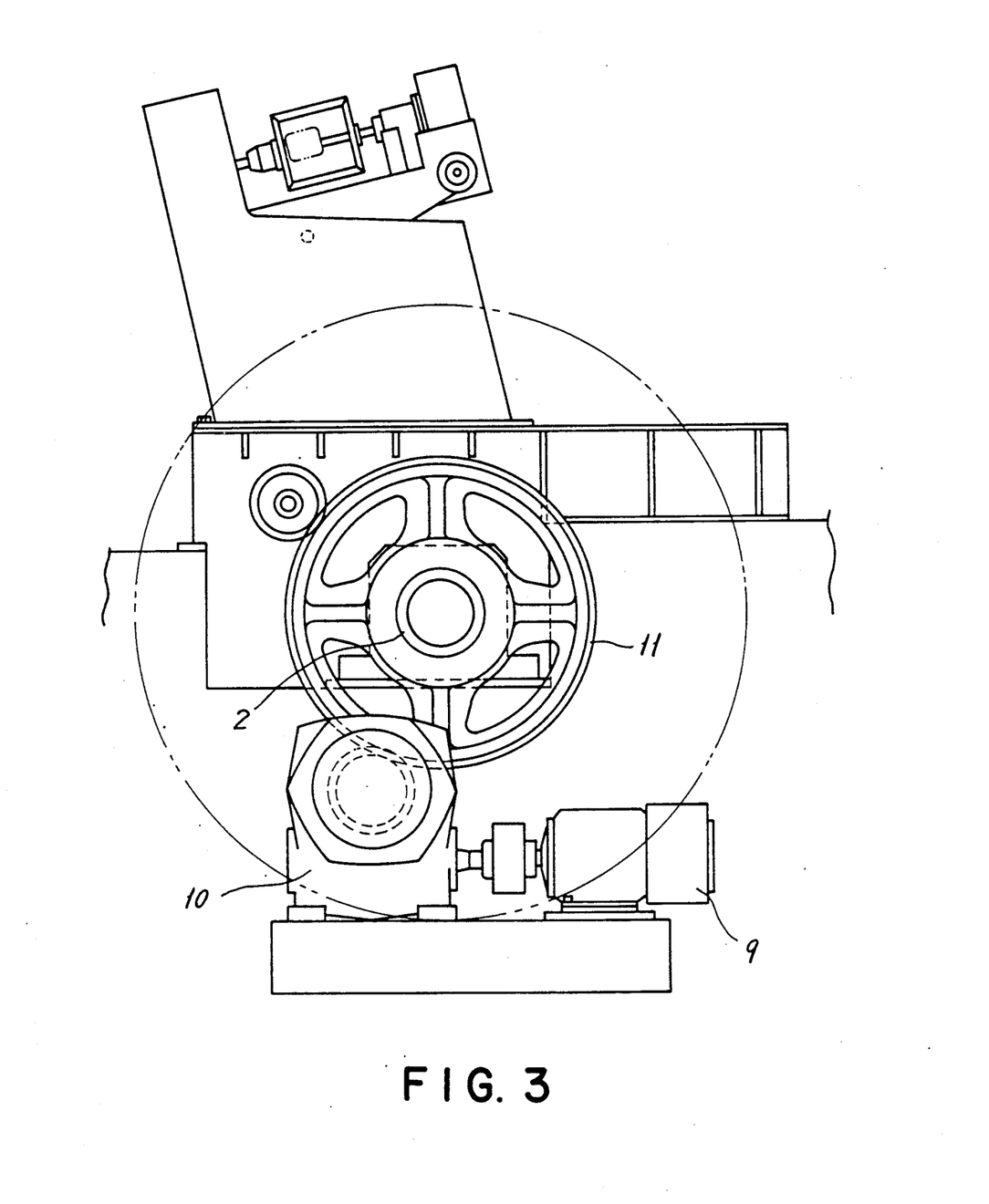
FIG. 3 is a righthand side view, partially eliminated, of the machine.

The mechanism of the mold clamping device 37 will be described hereunder with reference to FIGS. 2 and 3.

The rotating motion of an electric motor 9 is transmitted to a large gear member 11 rotatably mounted about the rotary axis 2 through the operation of a reduction motor 10 to drive the rotor 7 rotatable about the rotary axis 2 at a constant speed.

On one side, that is, the righthand side, of the rotor 7, a cam assembly 26 for controlling the clamping is secured to a machine frame, and a cam follower 25 to be engaged with the cam 26 is journaled upon a slide block 24 which is slidable in the radial direction of the rotor on a guide 23 secured to the rotor 7. In this manner, the slide block 24 reciprocates in the radial direction in response to the rotation of the rotor 7.

The slide block 24 is operatively connected to one end of a lever 18 means of a pin 22, a link 20 and a pin 21 in this order, the layer 18 being provided with a central portion pivoted upon to a pin 19 disposed on the rotor 7. The other end of the lever 18 is operatively connected to the slider 14 means of a pin 17, a link 15 and a pin 16. The slider 14 is supported so as to be slidable upon a guide rod 35 mounted upon the outer periphery of the rotor 7 and constitutes a slider-crank mechanism together with the lever 18 and the link 15. Namely, the slider 14 is moved linearly on the guide rod 35 in accordance with the pivoting movement of the lever 18.

The slider 14 is operatively connected to one of the split mold holders 13 means of a pin 27, a rod 28, a pin 29, a lever 30, a pin 32, a link 33, and a pin 34 in this order, and the central portion of the lever 30 is journaled upon a pin 31 disposed on the rotor 7. The moving directions of both end portions of the lever 30 are changed, so that the slider 14 and the split mold holder 13 are moved in directions opposite to each other.

The other one of the split mold holders 12 is coupled with the slide 14 means of a hydraulic cylinder unit 36 mounted upon the slider 14 so as to be movable in the same direction as that of the movement of the slider 14. Namely, the split mold holders 12 and 13 are driven so as to move away from or approach each other. The mold halves 1a and 1a are mounted upon the split mold holders 12 and 13, and the clamping force is applied to the mold halves 1a and 1a by the actuation of the hydraulic cylinder unit 36.

The hydraulic cylinder unit 36 operates such that the piston rod of the unit is displaced forwardly in accordance with the injection of an oil into the cylinder chamber and the piston rod is retracted back into the cylinder chamber by means of a spring accommodated in the cylinder when the pressure in a tube in communication with the cylinder chamber is lowered. The oil is supplied into or drained from the cylinder chamber through three-way valves, not shown, corresponding in number to those of the split mold units 1, disposed on the rotor 7. The supply tubes and the drain tubes for the three-way valves are collected and connected to a hydraulic pump or an oil tank through the interior of the rotary axle 2 and a rotary joint member. The three-way valves are actuated by an actuator arranged near the rotor 7.

The three-way valves are operated by the actuator to supply highly pressurized oil into the hydraulic cylinder unit 36 when the link 15 and the lever 18 of the slider-link mechanism are arranged in a line as shown (at the dead position) through means of the pins 16, 17, 19, and 21 and the mold holders 12 and 13 approach each other. At this time, the piston rod is displaced forwardly to apply the clamping force to the mold halves 1a and 1a mounted upon the split mold holders 12 and 13. The clamping force is received by the pin 19 and hence is not transmitted to the cam follower 25.

When the three-way valve is actuated by the actuator immediately before the opening of the split hold halves 1a and 1a and the interior of the hydraulic cylinder unit 36 is in communication with the drain tube, the piston is displaced backwardly by the biasing force of the spring disposed in the hydraulic cylinder unit 36 so as to thereby drain the oil in the cylinder unit as well as to draw in the piston rod to release the clamping pressure. Under these conditions, the split mold halves 1a and 1a are opened as shown within the upper portion of FIG. 2 by the operations of the cam 26 and the cam follower 25, but the clamping pressure is not transferred to the cam assembly 26 and the cam follower 25, so that the contact pressure to be applied thereto is small.

Figure 4:
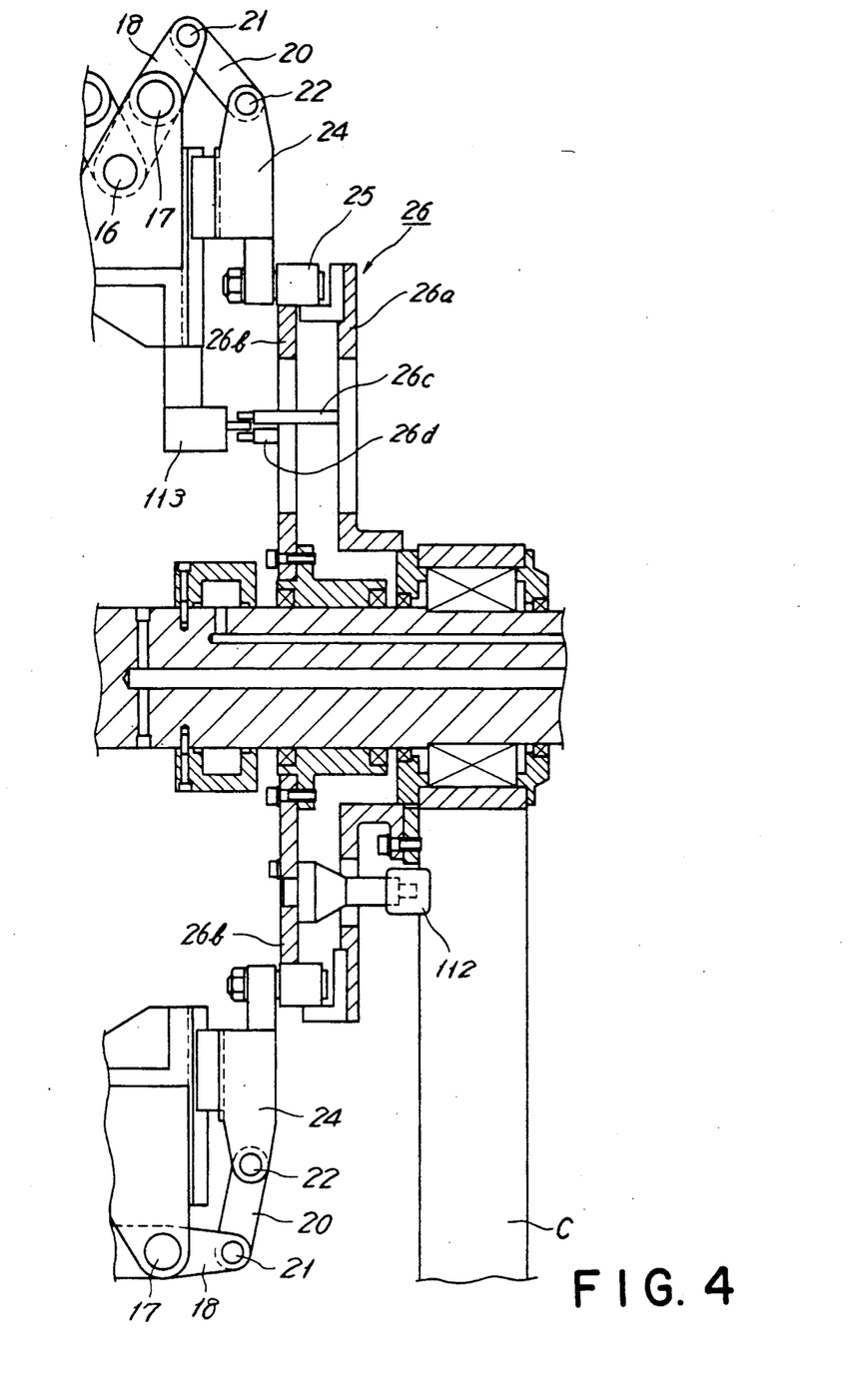
FIG. 4 is a front view of a mold clamping controlling cam used for the blow molding machine.

The structure of the cam assembly 26 described above will be explained hereunder with reference to FIG. 4.

The cam assembly 26 serves to control the closing or opening time of the mold halves 1a and 1a as described hereinbefore, and the cam assembly 26 comprises a stationary cam member 26a for controlling the mold closing time and a movable cam member 26b for controlling the mold opening time, the movable cam member 26b being positioned at a location opposed to the stationary cam member 26a and rotated by the actuation of a cam driving hydraulic cylinder 112 having a base portion journaled within the machine frame c.

A second stationary cam member or extension 26c for carrying out the hydraulic clamping operation is mounted upon the stationary cam member 26a and a second movable cam member or extension 26d is mounted upon the movable cam member 26b for carrying out the hydraulic clamping operation in synchronism with the movement of the movable cam member 26b.

Figure 5:
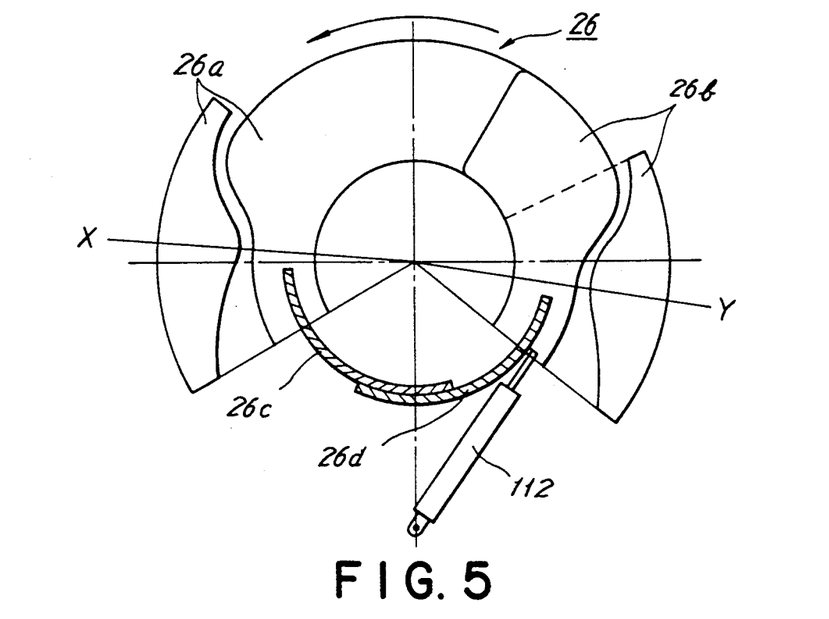
FIG. 5 is a view being explanatory of the controlling cam during the initial stage of the blow molding process.

FIG. 5 is a view showing the condition of the cam 26 in the initial stage of the blow molding process, during which the cam driving hydraulic cylinder 112 is not operated and the movable cam members 26b and 26d are rotated by the retraction of the piston rod. The split mold unit 1 is rotated, from the position X representing the time at which the mold halves 1a and 1a are completely closed under the control of the stationary cam member 26a to the position Y representing the time at which the mold opening operation starts under the control of the movable cam member 26b, with a reduced angle (for example, 175°), whereby the hydraulic pressure supplying period for the mold clamping hydraulic cylinder unit 36 is controlled by a hydraulic valve 113 for clamping the mold halves in association with the operations of the stationary cam member 26a and the movable cam member 26b.

Figure 6:
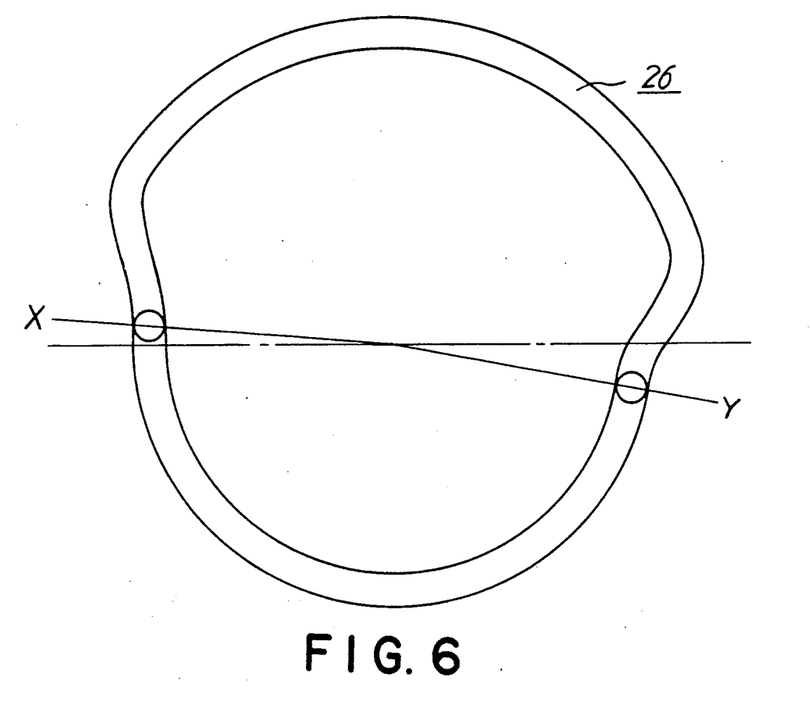
FIG. 6 is a front view of the cam shown in FIG. 5.

FIG. 6 is a view showing the shape of the cam assembly 26 during the initial stage of the blow molding process.

Figure 7:
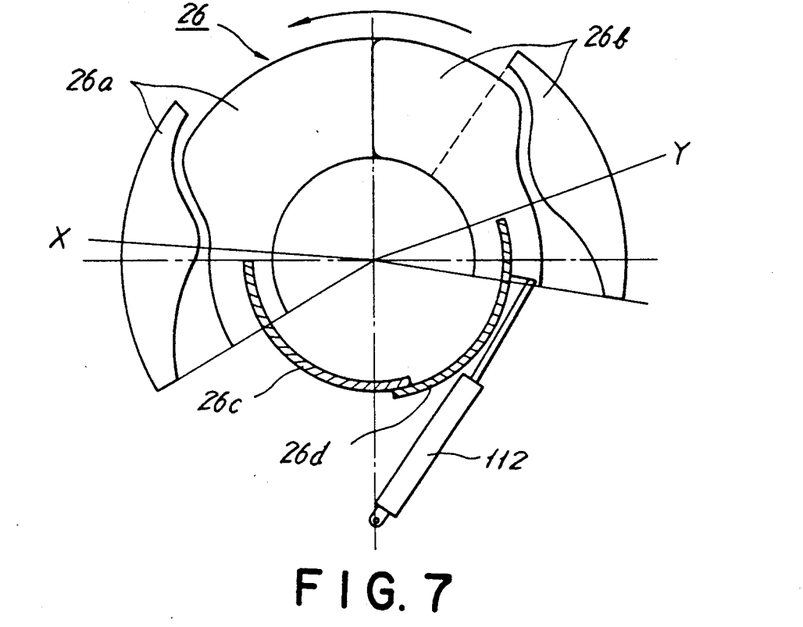
FIG. 7 is a view being explanatory of the controlling cam during the normal blow molding process.

FIG. 7 is a view showing the condition of the cam 26 during the normal blow molding stage after the initial blow molding stage, in which the hydraulic cylinder unit 112 for driving the cam is actuated and the movable cams 26b and 26d are rotated in accordance with the forward displacement of the piston rod in association with the actuation of the cylinder unit 112. The rotating angle of the split mold unit 1 for carrying out the blow molding process, from the position X representing the time at which the mold halves 1a and 1a are completely closed under the control of the stationary cam member 26a to the position Y representing the time at which the mold halves 1a and 1a are opened, is made large (for example, 205°), whereby the working space for treating the scrap such as a faulty or defective product which may be produced during the initial blow molding stage is adapted during the blow molding period.

Figure 8:
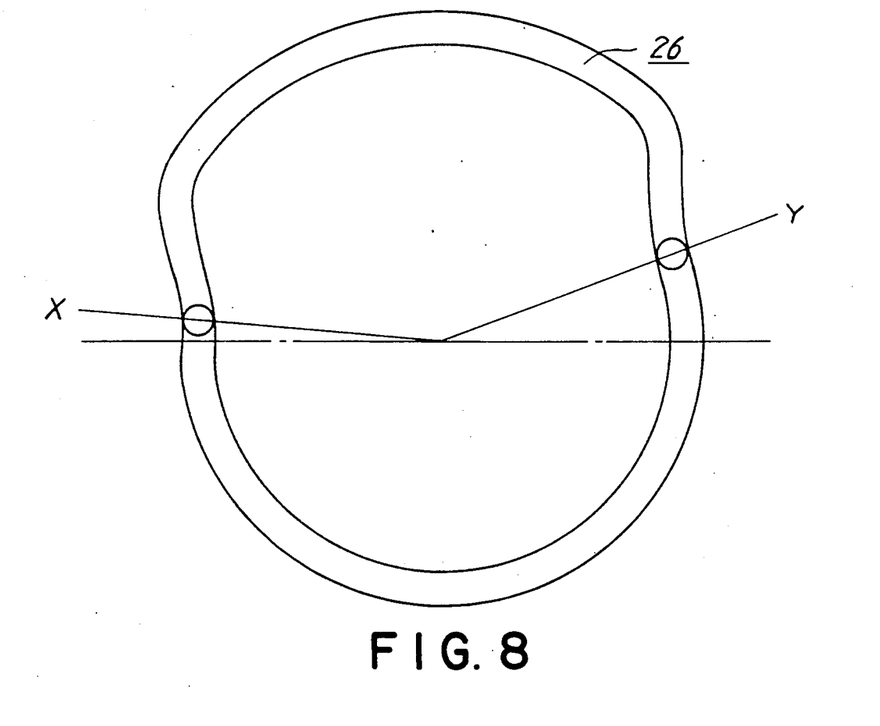
FIG. 8 is a front view of the cam shown in FIG. 7.

FIG. 8 is a view showing the shape of the cam during the normal blow molding period described with reference to FIG. 7.

A label arranging mechanism 4 will be described hereunder with reference to FIGS. 9 to 11 and FIG. 15.

Figure 9:
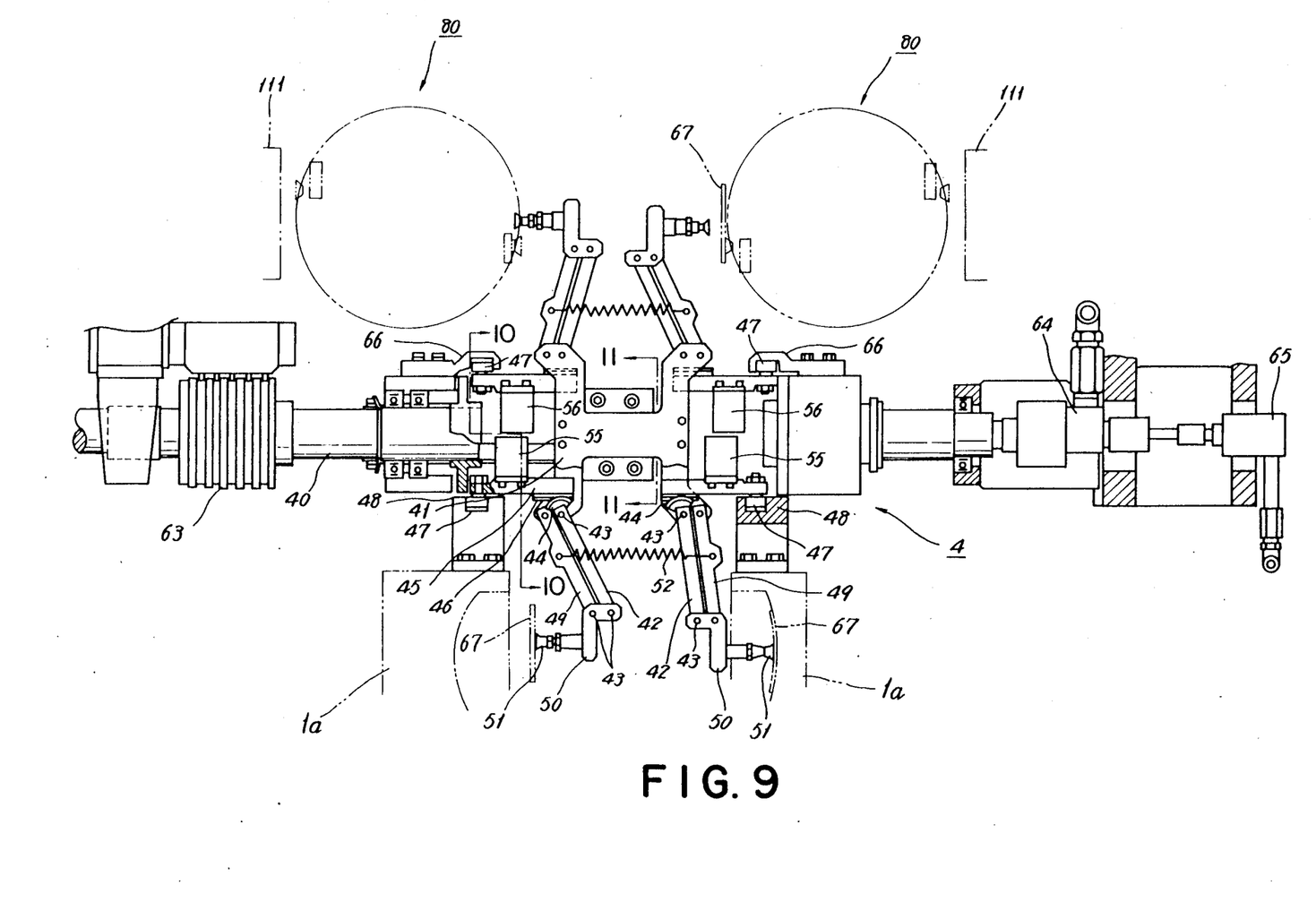
FIG. 9 is a front view, partially in section, of a label applying device of the machine shown in FIG. 1.

The label applying mechanism 4 serves to arrange the labels on the inner surface or surfaces of the mold halves 1a and 1a while in an opened state, and the label arranging mechanism 4 is secured to a rotary axle 40 so as to be rotatable therewith as shown in FIG. 9.

Figure 15:
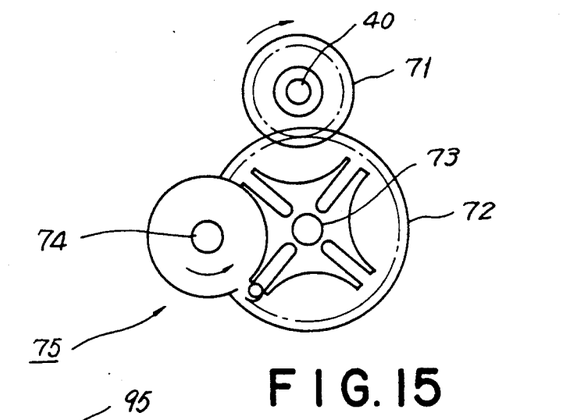
FIG. 15 is a schematic view of a driving mechanism for driving a label applying mechanism incorporated in the machine shown in FIG. 1.

The rotary axle 40 is rotated by a driving mechanism shown in FIG. 15 in a manner such that the rotary axle 40 is rotated in one direction through 180° between positions at which rubber cups 51 and 51 secured to the front ends of link mechanisms 49 and 49 are opposed to label take-out devices 80 and 80 and positions at which the cups 51 and 51 are opposed to the inner walls of the mold halves 1a and 1a (as shown in FIG. 9), the cups being stopped at these positions.

In a modification, four, three or two rubber cups 51 may be located with equal intervals defined therebetween, so that the rotating angle 180° of the rotary axle mentioned above may include 90° and 120°.

A driving shaft 74 of the driving device described above is rotated through one rotation during the transfer by one pitch of the split mold unit 1, and the rotation of the driving shaft 74 is transferred to the shaft 73 through a Geneva stop mechanism 75 so that the shaft is rotated by 90° and then stopped after one rotation of the shaft 73.

The rotation of the shaft 73 is transferred to the rotary axle 40 through the gearings 72 and 71 with the rotation speed ratio of 1:2.

Namely, the rubber cups 51 and 51 take positions opposing the inner walls of the mold halves 1a and 1a when the mold halves 1a and 1a pass the position shown in FIG. 9.

As shown in FIG. 9, the link mechanism 42, 49, the lever holder 41, and the dispenser heads 50 are mutually connected by means of pins 43 so as to constitute four links each in the shape of a parallelogram. The lever holder 41 is secured integrally with the rotary axle 40.

Figure 10:
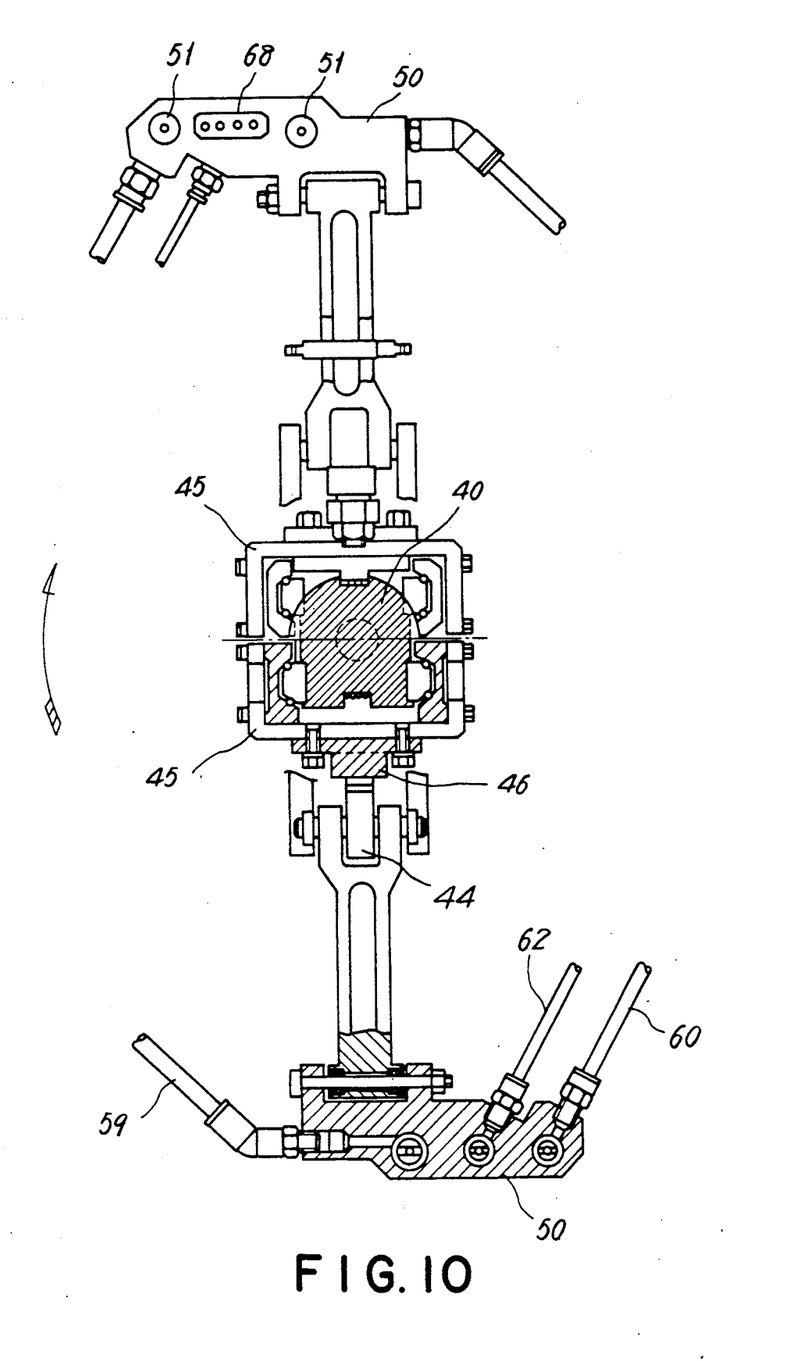
FIG. 10 is a sectional view taken along the line 10—10 in FIG. 9.

A segment gear 44 secured to the base portion of the link 42 is meshed with a rack 46 secured to a slide block 45, and when the slide block 45 is displaced in the axial direction of the rotary axle 40, the link 42 supported by the lever holder 41 is swung about the pin 43. The slide block 45 is supported in a manner such that the slide block 45 is restricted in the rotating direction and is slidable in the axial direction as shown in FIG. 10.

The link 49 is urged by the tension spring 52 in a direction towards the central portion thereof, but when the cam follower 47 provided for the slide block 45 is pushed by the cam 48 secured to the mold halves 1a and 1a, the slide block 45 is shifted towards the central portion thereof and the link 42 is accordingly swung outwardly through means of the rack 46 and the segment gear 44. At this time, a label adhered to the rubber cup 51 is mounted upon the inner wall of one of the mold halves 1a as described hereinafter.

An air suction port is opened to the inner wall of the mold half 1a, and the port holds the label 67, which is then fused to the surface of a product 8.

At a location above the rotary axle 40, a link the parallelogram is supported at the predetermined position by the engagement of the cam follower 47 with the cam 66 secured to a bearing unit journaling the rotary axle 40, whereby the label 67 is received by the label take-out device 80.

The dispensing head 50 serves to transfer the label 67 by the vacuum suction function and the blowing of compressed air. For this reason, the dispensing head 50 for, for example, the front label is provided with two cups 51, 51 and an air jetting nozzle unit 68 as shown in FIG. 10. The rubber cups 51 and 51 are connected to a vacuum pump through flexible hoses 59, 60, an electromagnetic valve 55 and a rotary joint 64. The air jetting nozzle unit 68 is also connected to a compressed air tank through a flexible hose 62, an electromagnetic valve 56, and a rotary joint 65.

In order to stick the labels 67 upon the front and rear surfaces of the product 8, another dispensing head for the rear label is located on the same side of the dispensing head for the front label with respect to the rotary axle 40. The rubber cups for the dispensing head for the rear surface are connected to the electromagnetic valve 55 through flexible hoses 57 and 58, and the air jetting nozzle unit of the dispensing head for the rear surface is connected to the electromagnetic valve 56 through a flexible hose 61. Other electromagnetic valves are connected to the dispensing heads located on the opposing side with respect to the rotary axle.

Figure 11:
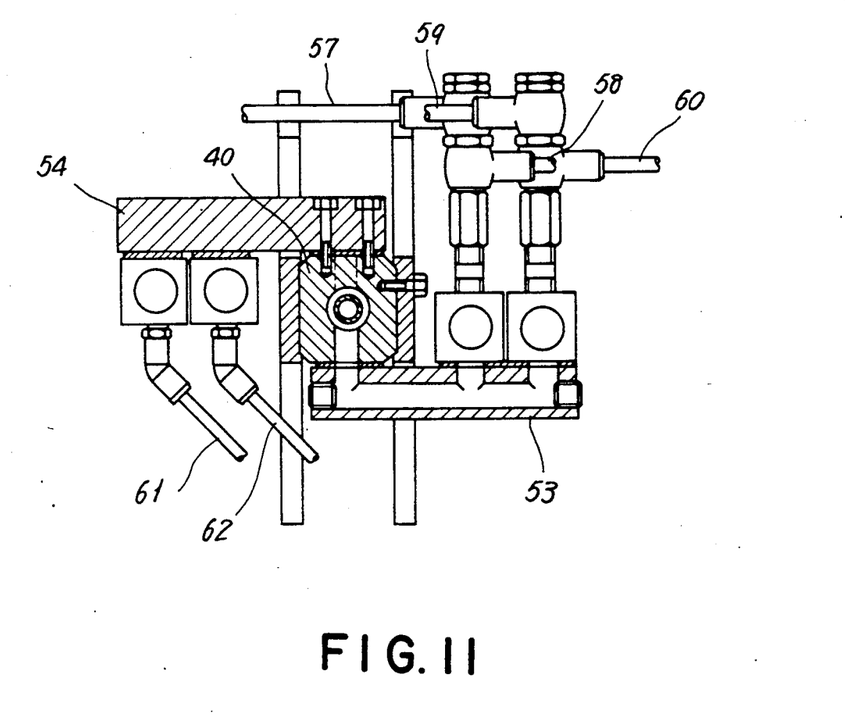
FIG. 11 is sectional view taken along the line 11—11 in FIG. 9.

As shown in FIG. 11, these flexible hoses are secured to the rotary shaft 40 through means of blocks 53 and 54 and are in communication with the electromagnetic valves through the inner hollow portion of the rotary shaft 40. These electromagnetic valves are opened or closed by the conduction of current through a slip ring 63 shown in FIG. 9. The currents through the electromagnetic valves are controlled by signals generated from a sensor for detecting the rotation angle of the rotor 7. When the dispensing head 50 receives the label 67 from the label take-out device 80, the label 67 is retained by means of the rubber cup 51 and when the label 67 is positioned or near a predetermined at portion the inner wall of one mold half 1a, the air is ejected toward the label 67 from the air jetting nozzle unit 68.

The label take-out device 80 will be described in detail hereunder with reference to FIGS. 12 to 14 and FIG. 16.

Figure 12:
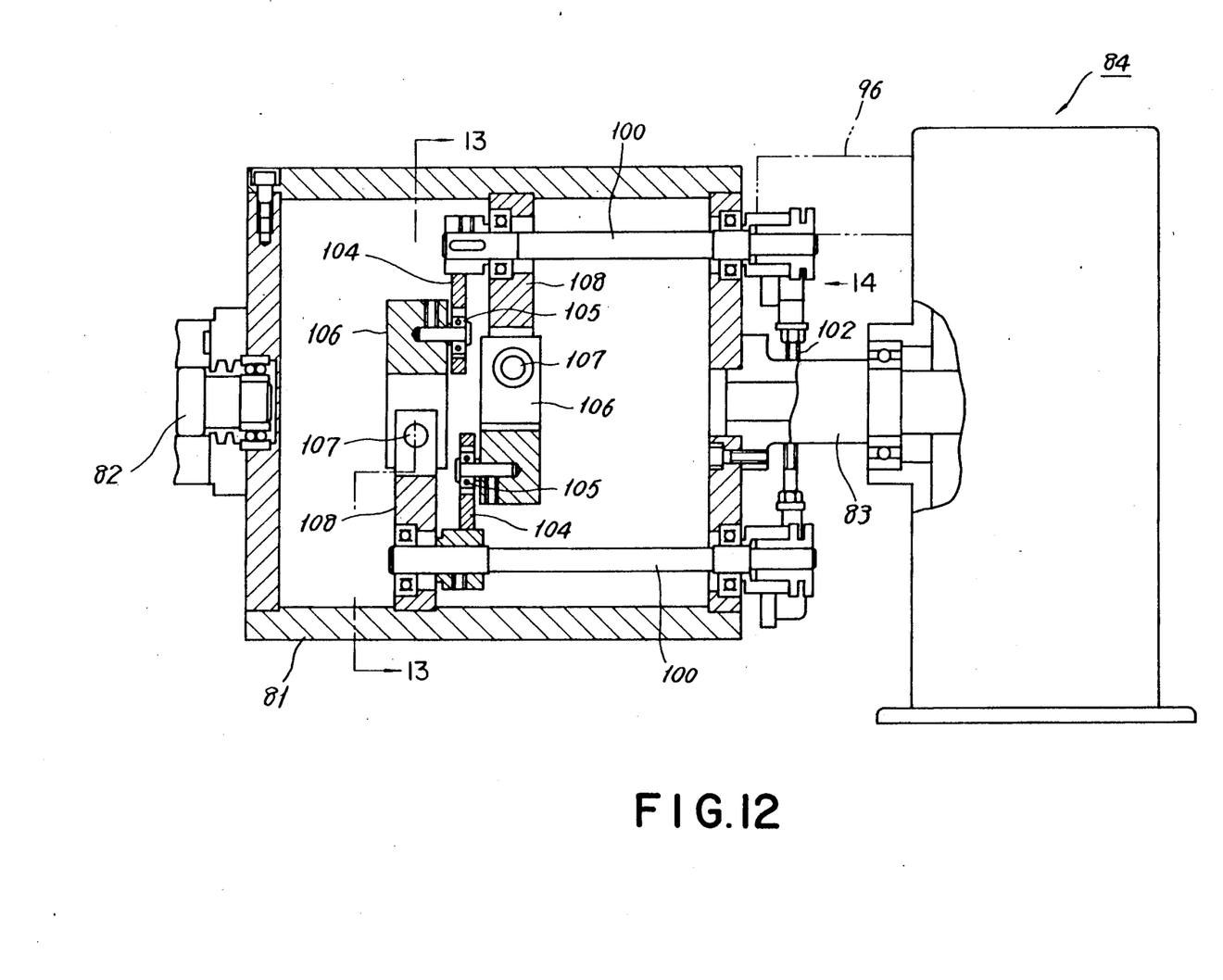
FIG. 12 is a sectional view taken along the line 12—12 in FIG. 13 showing a label take-out device of the machine shown in FIG. 1.
Figure 13:
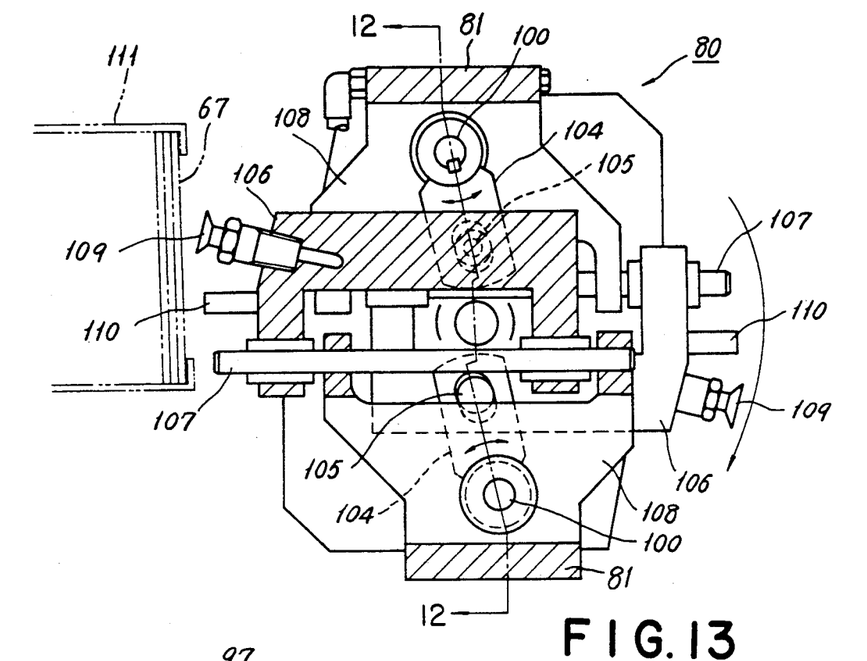
FIG. 13 is a sectional view taken along the line 13—13 in FIG. 12.

A frame 81 of the label take-out device 80 is supported by a shaft 82 and a driving shaft 83 so as to be intermittently rotatable through angles of 180° and a shaft 96 carries out one reciprocating pivoted movement when the driving shaft 83 stops.

Figure 16:
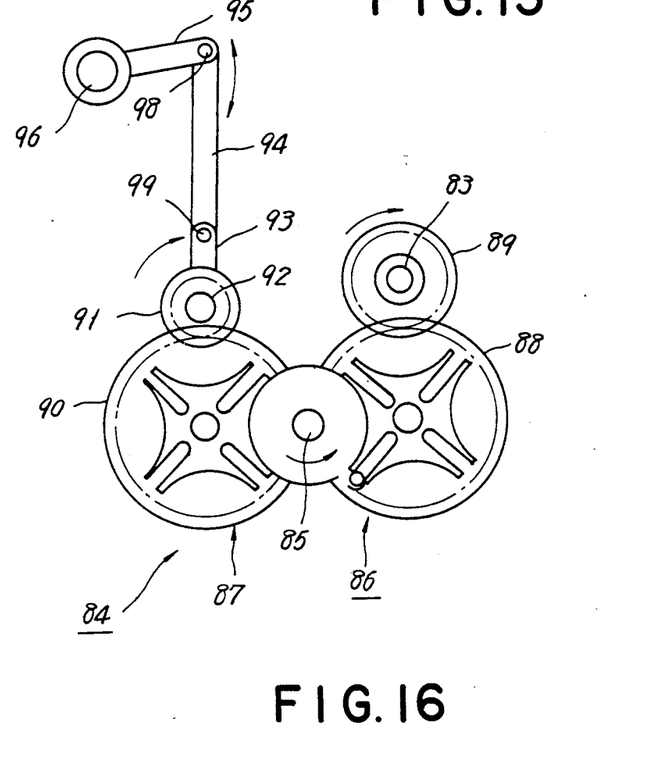
FIG. 16 is a schematic view of a label take-out device located in the machine shown in FIG. 1.

The operation of a driving unit 84 for the label take-out device 80 for driving the shaft 96 and the driving shaft 83 will be described with reference to FIG. 16.

A rotary shaft 85 is driven so as to be rotated through one revolution during the transfer by one pitch of the split mold unit 1 and the rotation of the shaft 85 is transferred so that when the shaft 85 is rotated through one revolution through means of a Geneva stop mechanism 86 and gearings 88 and 89, the shaft 83 is rotated once through 180° and stopped, and so that when the shaft 85 is rotated through one revolution through means of a Geneva stop mechanism 87 and gearings 90 and 91, the shaft 92 is rotated once through 360° and stopped there. The shaft 92 is also rotated when the driving shaft 83 stops.

Figure 14:
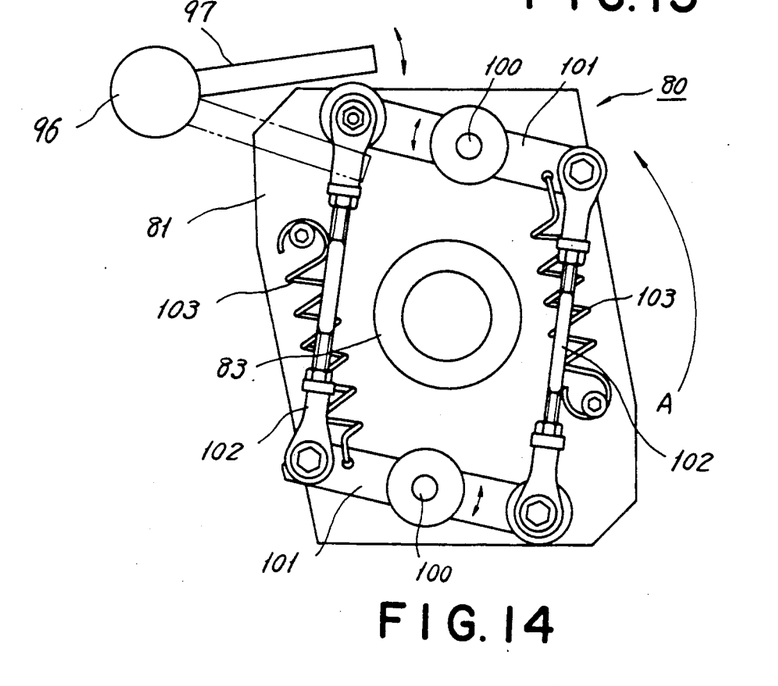
FIG. 14 is a view viewed in the arrowed direction 14 in FIG. 12.

The driving shaft 83 stops at a position at which the frame 81 secured to the driving shaft 83 as shown in FIG. 13 or 14, that is, at a position at which rubber cups 109 and 109 of the label take-out device oppose respectively a label magazine 111 and a label arranging device 4. The shaft 96 carries out one reciprocating pivoting motion through means of links 93, 94, 95, and pins 98, 99 when the driving shaft 83 is stopped by means of the rotary shaft 92.

As shown in FIG. 14, a pair of levers 101 and 101 have central portions which are connected to shafts 100 and 100 in an opposing arrangement, and both ends of the respective levers are mutually coupled by connecting rods 102 and 102 so as to constitute a parallelogram link mechanism. As shown in FIG. 12, shafts 100 and 100 are supported by the frame 81 and guide rod stays 108 and 108 so as to be rotatable and the levers 101 and 101 are biased in the same direction by means of tension springs 103 and 103.

As described above, for every one reciprocating pivotal movement of the shaft 96, a lever 97 secured to the shaft 96 is pivotal once between the position shown by means of the solid line in FIG. 14 and the position shown means of the two-dot and chain line.

During this swinging movement, the lever 101 is pushed and swung so as to thereby rotate the shafts 100 and 100. The levers 104 and 104 secured to the shafts 100 and 100 are then swung so as to thereby reciprocate cam followers 105 and 105 which are engaged with the levers 104 and 104, respectively.

The cam followers 105 and 105 are supported by slide blocks 106 and 106, which re supported so as to be slidable by guide rods 107 and 107 mounted within guide stays 108 and 108, so that the slide blocks 106 and 106 are reciprocated together with the swinging movement of the levers 104 and 104, respectively.

During this operation, rubber cups 109 and 109 and air jetting nozzle units 110 and 110 receive the labels 67 from the label magazine 111 and transfer the labels to the label arranging device 4, and in order to carry out the control of these operations, electromagnetic valves, not shown, are disposed, the characteristics of the electromagnetic valves being substantially the same as those described with respect to the label arranging device 4.

The rubber cup 109 thus receiving the label 67 from the label magazine 111 is moved to a position opposed to the label arranging device 4 when the frame 81 is rotated by 180° in the arrowed direction in FIG. 13, and the label 67 is transferred to the label arranging device 4 when the slide block 106 is reciprocated during the next step.

In the embodiment described, the slider crank mechanism of the mold clamping device may be provided with a split mold holder as a slider, and in this modification, the displacement of the split mold holder is converted to the movement in a direction reverse to this displacement by means of a lever. The movement is transferred to a slider located opposite to the split mold holder. A hydraulic cylinder unit may be arranged between the latter mentioned slider and another split mold holder. In this modification, substantially the same functions and effects as those described hereinbefore can be attained.

INDUSTRIAL USAGE

According to the apparatus of this invention, a label is fused at a high temperature to a plastic vessel or container, so that the label can be strongly adhered to the vessel by selecting the material for the label to be the same material as that of the plastic vessel, the vessel being suitable for containing food. In addition, the selection of the same material for the label and the vessel can reinforce the material of the vessel, thus resulting in a saving of material for producing the vessel. Moreover, since the label can be exactly positioned and stack to the surface of a product, the beautiful appearance of the product can be attained.

Furthermore, a cam for controlling the mold clamping comprises a stationary cam member adapted to close the mold halves and a movable cam member adapted to open the mold halves, so that a working space required during the initial stage of the blow molding process for treating scrap such as a faulty or defective product be achieved during the normal blow molding period, whereby a cooling effect during the blow molding period can be achieved and a product with high quality can be produced. In addition, a label applying device can be incorporated without reducing the rotation angle for clamping the split mold unit.

Furthermore, at the time of the attachment of the mold halves, the mating of the mold halves, the cutting of the scrap parison, or the like, these operations can be observed without rotating the rotor to the mold clamping position by carrying out the working steps in the range of the movable cam member, thus remarkably improving the workability.

Obviously, many modifications and variations of the present invention are possible in light of the above teachings. It is therefore to be understood that within the scope of the appended claims, the present invention may be practiced otherwise than as specifically described herein.

We claim:

1. Label applying apparatus for use in connection with a rotary blow molding machine, comprising:
   a plurality of split mold units, each comprising a pair of separable mold halves, disposed about an outer peripheral surface of a rotor with equal spaces defined therebetween, and wherein said rotor is rotatable about a horizontal axis;
   means for opening and closing said separable mold halves away from and toward each other in a direction parallel to said horizontal axis;
   means for extruding a parison into said mold halves when said mold halves are disposed in an open state, for closing said mold halves subsequent to said extrusion of said parison into said open mold halves, and for blowing air into an inner hollow portion of said parison extruded into said mold halves so as to form a hollow product; and
   means for applying a heated molding material to a label in order to facilitate adherence of said label to said product, and for positioning said label, having thermally fusible properties, upon inner wall portions of said mold halves,
   said label positioning means comprising a plurality of label dispensing heads, each of said heads having suction means disposed thereon for retaining a label, received from a label magazine, upon said head, and dispensing means disposed thereon for dispensing said label from said head into one of said mold halves, rotatably mounted in an intermittent manner and in a unidirectional mode about an axis disposed parallel to said horizontal axis of said rotor such that when one of said plurality of label dispensing heads is disposed within the vicinity of said label magazine so as to receive a label from said label magazine, another one of said plurality of label dispensing heads, having a label disposed thereon, is disposed within the vicinity of said mold halves so as to be capable of applying said label to one of said mold halves.

2. Apparatus as set forth in claim 1, wherein:
   said suction means of said label positioning means comprises rubber cups upon which said labels are adhered.

3. A label applying apparatus in a rotary blow molding machine according to claim 2, wherein said rubber cup secured to said dispensing head receives the label from a label take-out device for taking out the label from said label magazine at a stopping position of said intermittent rotating motion of said label positioning means.

4. Apparatus as set forth in claim 1, wherein:
   said dispensing means of said label positioning means comprises air-jet type dispensing means.

5. Apparatus as set forth in claim 1, wherein:
   said plurality of label dispensing heads comprises a pair of label dispensing heads disposed diametrically opposite each other upon opposite sides of said axis disposed parallel to said rotor axis whereby said label positioning means is rotated through an angular movement of 180° between said label magazine and said one of said mold halves.

6. A label applying apparatus in a rotary blow molding machine according to claim 1, wherein each of said label dispensing heads is rotatably mounted about said axis disposed parallel to said rotor axis by means of two parallel links which constitute bilaterally paired assemblies.

7. A label applying apparatus in a rotary blow molding machine according to claim 1, wherein a pair of mold unit holders for holding bilateral mold halves respectively are slidably supported by a guide rod mounted to said rotor, one of said holders being operatively connected to through means of a hydraulic cylinder unit, to a slider slidably supported by said guide rod and the other one of said holders being operatively connected to said slider through a lever so as to move in a direction opposite to the movement of said slider, said slider being connected to a cam follower engaging a clamp control cam assembly arranged near said rotor through a slider-crank mechanism supported by said rotor so as to be movable in a radial direction thereof, and which is capable of being positioned at a dead position, and a mold clamping device is further located for applying a clamping force to said mold unit holders by said hydraulic cylinder unit when said slider-crank mechanism is positioned at said dead position.

8. A label applying apparatus in a rotary blow molding machine according to claim 7, wherein said clamp control cam assembly is provided with a stationary cam member on a mold close side and a movable cam member on a mold open side, so that the timing of the mold opening is made variable.

9. A label applying apparatus in a rotary blow molding machine according to claim 8, wherein said stationary cam member is secured to a machine frame of the rotary blow molding machine and said movable cam member is actuated by a hydraulic cylinder assembly having a base portion journaled to said machine frame.

10. A label applying apparatus in a rotary blow molding machine according to claim 8, wherein a stationary cam for hydraulically clamping the mold unit is attached to said stationary cam member, a movable cam for hydraulically clamping the mold unit is attached to said movable cam member, and said movable cam is movable in synchronism with the mold clamping movable cam member, whereby the hydraulic pressure applying time with respect to said mold clamping hydraulic cylinder assembly is made variable.

* * * * *